US012604106B2

(12) United States Patent
Long

(10) Patent No.: US 12,604,106 B2
(45) Date of Patent: Apr. 14, 2026

(54) CAMERA ASSEMBLY AND ELECTRONIC DEVICE

(71) Applicant: VIVO MOBILE COMMUNICATION CO., LTD., Dongguan (CN)

(72) Inventor: Haile Long, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 419 days.

(21) Appl. No.: 18/210,806

(22) Filed: Jun. 16, 2023

(65) Prior Publication Data

US 2023/0328398 A1 Oct. 12, 2023

Related U.S. Application Data

(63) Continuation of application No. PCT/CN2021/137137, filed on Dec. 10, 2021.

(30) Foreign Application Priority Data

Dec. 17, 2020 (CN) .......................... 202011496046.9

(51) Int. Cl.
| | |
|---|---|
| *H04N 23/90* | (2023.01) |
| *G03B 17/55* | (2021.01) |
| *G03B 17/56* | (2021.01) |

(52) U.S. Cl.
CPC ............. *H04N 23/90* (2023.01); *G03B 17/55* (2013.01); *G03B 17/566* (2013.01)

(58) Field of Classification Search
CPC ........ H04N 23/90; H04N 23/57; H04N 23/45; H04N 23/50; G03B 17/55; G03B 17/566; G03B 17/56; H04M 1/0264
See application file for complete search history.

(56) References Cited

U.S. PATENT DOCUMENTS

| | | | | |
|---|---|---|---|---|
| 12,101,542 | B2 * | 9/2024 | Han | ........................ H04N 23/55 |
| 2018/0329059 | A1 | 11/2018 | Liu et al. | |
| 2020/0021720 | A1 * | 1/2020 | Wang | ..................... H04N 23/90 |
| 2020/0310072 | A1 | 10/2020 | Hubert et al. | |
| 2020/0382683 | A1 | 12/2020 | Wang et al. | |
| 2021/0029276 | A1 | 1/2021 | Yao | |
| 2021/0152717 | A1 | 5/2021 | Tsuzaki et al. | |
| 2021/0266387 | A1 * | 8/2021 | Ha | ..................... H04M 1/0264 |
| 2021/0281729 | A1 * | 9/2021 | Queeney | ................ G03B 17/12 |
| 2021/0389551 | A1 | 12/2021 | Jang | |

(Continued)

FOREIGN PATENT DOCUMENTS

| | | |
|---|---|---|
| CN | 203688967 U | 7/2014 |
| CN | 107181900 U | 9/2017 |

(Continued)

*Primary Examiner* — Sinh Tran
*Assistant Examiner* — Zhenzhen Wu
(74) *Attorney, Agent, or Firm* — The Webb Law Firm

(57) ABSTRACT

A camera assembly includes a first holder, a second holder, a first camera, and a second camera, where the first camera is disposed on the first holder, and the second camera is disposed on the second holder; and the second holder is disposed adjacent to the first holder. The first holder is provided with a first protrusion extending towards the second holder. The second holder is provided with a second protrusion extending towards the first holder. The first protrusion and the second protrusion are disposed in a staggered and stacked manner.

16 Claims, 5 Drawing Sheets

(56) References Cited

U.S. PATENT DOCUMENTS

| | | | | |
|---|---|---|---|---|
| 2022/0070347 A1* | 3/2022 | Han | ...................... | G03B 13/36 |
| 2022/0179164 A1 | 6/2022 | Kim | | |
| 2023/0164251 A1* | 5/2023 | Jung | ................... | H04N 23/685 |
| | | | | 455/556.1 |
| 2024/0406527 A1* | 12/2024 | Birnbaum | .............. | H04N 23/45 |

FOREIGN PATENT DOCUMENTS

| | | | | | |
|---|---|---|---|---|---|
| CN | 206908708 U | | 1/2018 | | |
| CN | 207999598 U | | 10/2018 | | |
| CN | 110519490 A | | 11/2019 | | |
| CN | 210137372 U | | 3/2020 | | |
| CN | 111818248 A | * | 10/2020 | ............ | H04N 23/50 |
| CN | 112565579 A | | 3/2021 | | |
| JP | 2020022154 A | | 2/2020 | | |
| WO | 2017118850 A1 | | 7/2017 | | |
| WO | 2018028718 A1 | | 2/2018 | | |
| WO | 2019198318 A1 | | 10/2019 | | |
| WO | 2020076112 A1 | | 4/2020 | | |
| WO | 2020197348 A1 | | 10/2020 | | |

* cited by examiner

100

1024    1022    1044

102    1042    104

Connection direction

102

Connection direction

1022

104

1042

Connection
direction

108

1045

102

104

1023

1043

1025

Connection direction

Connection direction

300

100

302

CAMERA ASSEMBLY AND ELECTRONIC DEVICE

CROSS-REFERENCE TO RELATED APPLICATIONS

This application is a Bypass Continuation application of International Application No. PCT/CN2021/137137 filed Dec. 10, 2021, and claims priority to Chinese Patent Application No. 202011496046.9 filed Dec. 17, 2020, the disclosures of which are hereby incorporated by reference in their entireties.

BACKGROUND OF THE INVENTION

Field of the Invention

This application pertains to the field of electronic device technologies, and in particular, to an camera assembly and an electronic device.

Description of Related Art

With the increasing demand of consumers for the camera function of mobile devices, when producing electronic products, manufacturers often set a plurality of cameras to meet different application scenarios.

Usually, there are a larger number of cameras in the electronic product, and the entire camera module of mobile phone needs a larger space.

SUMMARY OF THE INVENTION

According to a first aspect, an embodiment of this application provides a camera assembly, including: a first holder, a second holder, a first camera, and a second camera, where the first camera is disposed on the first holder, and the second camera is disposed on the second holder; and the second holder is disposed adjacent to the first holder, the first holder is provided with a first protrusion extending towards the second holder, the second holder is provided with a second protrusion extending towards the first holder, and the first protrusion and the second protrusion are disposed in a staggered and stacked manner.

According to a second aspect, an embodiment of this application provides an electronic device, including: a body; and the camera assembly of the embodiment according to the first aspect, disposed on the body, where the camera assembly includes at least one of the following camera modules: a front camera module of the electronic device or a rear camera module of the electronic device.

Figure 1:
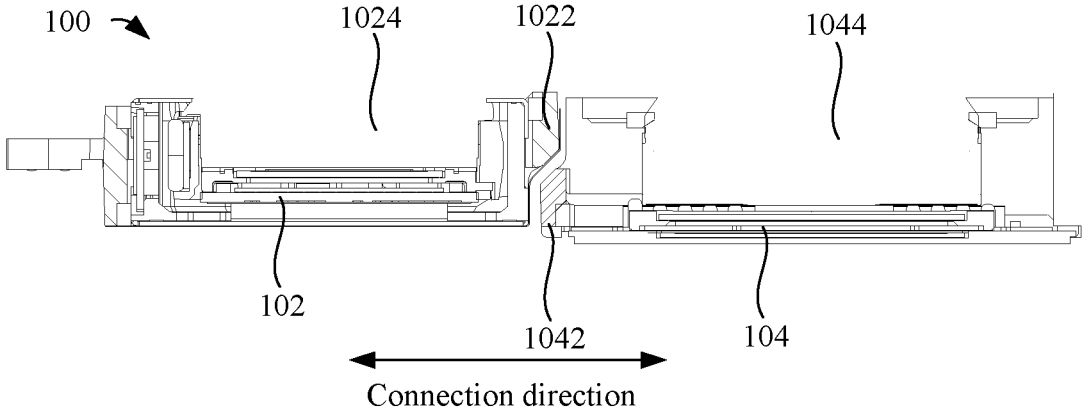
FIG. 1 is a schematic structural diagram of a camera assembly according to an embodiment of this application.

A correspondence between reference numerals and component names in FIG. 1 to FIG. 8 is as follows:
100 camera assembly; 102 first holder; 1022 first protrusion; 1023 first mating chamfer; 1024 first installation position; 1025 first avoidance groove; 104 second holder; 1042 second protrusion; 1043 second mating chamfer; 1044 second installation position; 1045 second avoidance groove; 106 sealing member; 108 heat dissipation plate; 202 first camera; 204 second camera; 300 electronic device; and 302 body.

DESCRIPTION OF THE INVENTION

Embodiments of this application will be described below in detail, and examples of the embodiments are illustrated in the accompanying drawings. The same or similar reference numerals always indicate the same or similar elements or elements having the same or similar functions. The embodiments described below with reference to the accompanying drawings are exemplary, and are only intended to explain this application and should not be understood as a limitation of this application. All other embodiments obtained by a person of ordinary skill in the art based on the embodiments of this application shall fall within the protection scope of this application.

Features of the terms "first" and "second" in the specification and claims of this application may explicitly or implicitly include one or more of the features. In the description of this application, unless otherwise specified, "a plurality of" means two or more. In addition, in the specification and the claims, "and/or" represents at least one of connected objects, and a character "/" generally represents an "or" relationship between associated objects.

In the description of this application, it should be noted that, unless specifically defined and limited otherwise, meanings of terms "install", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. For a person of ordinary skill in the art, the specific meanings of the foregoing terms in this application may be understood according to specific circumstances.

The camera assembly provided in the embodiments of this application is mainly used for the electronic device, for example, a mobile terminal such as a mobile phone, a wearable device, a tablet computer, a laptop computer, a mobile computer, a handheld game console, a video recorder, a camcorder, or the like. Certainly, the camera assembly can also be applied not only to the electronic device but also to other devices that are used to take pictures through cameras.

A camera assembly 100 and an electronic device 300 provided in the embodiments of this application will be described below with reference to FIG. 1 to FIG. 8.

As shown in FIG. 1 to FIG. 6, an embodiment of this application proposes a camera assembly 100, which includes a first holder 102 and a second holder 104, and a first camera 202 and a second camera 204 respectively disposed on the first holder 102 and the second holder 104. The first holder 102 and the second holder 104 are disposed adjacent to each other, and the first holder 102 and the second holder 104 are separately provided with protrusions extending towards the other side. Optionally, the first holder 102 is provided with a first protrusion 1022 extending towards the second holder 104, and the second holder 104 is provided with a second protrusion 1042 extending towards the first holder 102. Based on a staggered and stacked arrangement of the first protrusion 1022 and the second protrusion 1042, an overall size of the camera assembly 100 in a direction adjacent to the first holder 102 and the second holder 104 is greatly reduced by using a common edge space, which is conducive to a miniaturization design. In this way, in a limited space, an installation space can be provided for other products. For example, when being applied to a smart phone, the camera assembly 100 can provide a space for a battery, a wireless charging coil, and the like, so as to realize higher power charging and greatly enhance the competitiveness of the product.

In addition, by integrating the camera assembly 100 as a whole, the modular design can be improved, which also facilitates the production and assembly of the product.

In this embodiment of this application, the first holder 102 and the second holder 104 are disposed adjacent to each other, and the size of the first protrusion 1022 and the second protrusion 1042 in the connection direction can be effectively reduced under an overlapping action.

Figure 2:
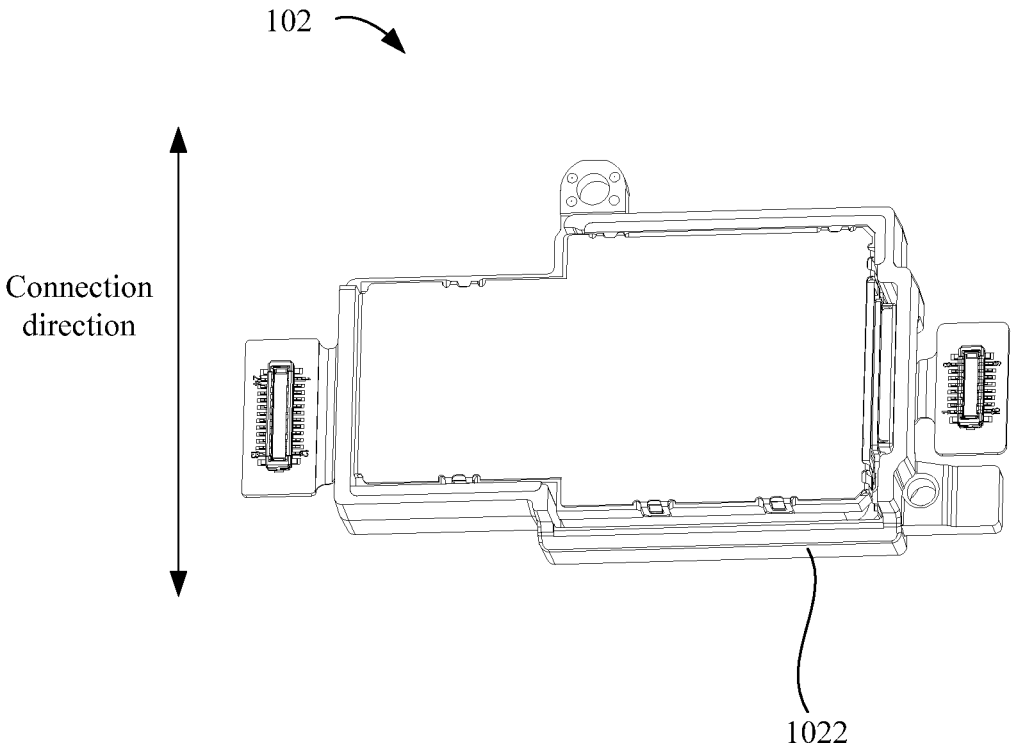
FIG. 2 is a schematic structural diagram of a camera assembly according to an embodiment of this application.
Figure 3:
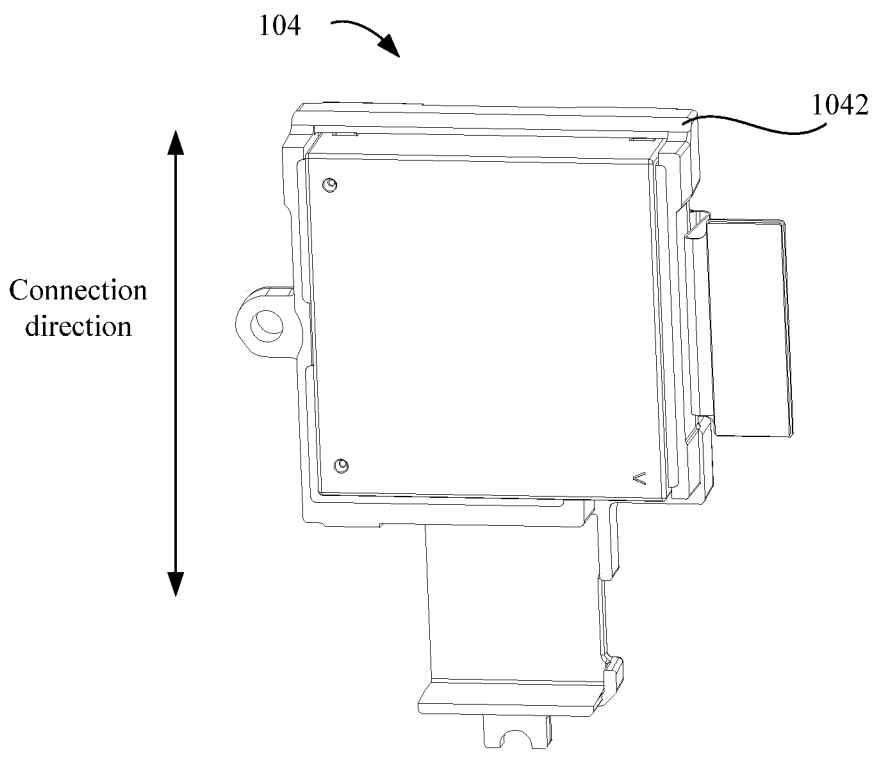
FIG. 3 is a schematic structural diagram of a camera assembly according to an embodiment of this application.

It should be noted that, as shown in FIG. 1 to FIG. 3, the connection direction of the first holder 102 and the second holder 104 is an adjacent direction of the first holder 102 and the second holder 104. For example, if the first holder 102 is disposed on the front side of the second holder 104, the connection direction is a front-back direction, and if the first holder 102 is disposed on the left side of the second holder 104, the connection direction is the left-right direction. When a plurality of camera assemblies 100 proposed in this embodiment are used in one product, sizes of different camera assemblies 100 in the connection direction can be further controlled, which can be flexibly selected based on a specific position and space limitation.

For example, a structure of the first holder 102 is shown in FIG. 2, a lower side in a connection direction is provided with the first protrusion 1022, and a structure of the second holder 104 is shown in FIG. 3, an upper side in a connection direction is provided with the second protrusion 1042.

Certainly, there may be one or more first cameras 202 on the first holder 102, and there may be one or more second cameras 204 on the second holder 104.

In an embodiment, as shown in FIG. 1, there are one first holder 102 and one second holder 104, the first holder 102 is provided with one first camera 202, and the second holder 104 is provided with one second camera 204.

In another embodiment, the number of the first holders 102 is two, and the two first holders 102 are integrally formed. Since each first holder 102 is provided with a first camera 202, after the two first holders 102 are integrally processed, a part matching different second holders 104 in a staggered and stacked manner may be formed, and the size can be further reduced in a plurality of directions or in a single direction. Certainly, it can further be understood that because installation positions of different cameras need to meet specific requirements, installation position requirements of specific cameras can further be met through the foregoing integrated forming method.

Figure 4:
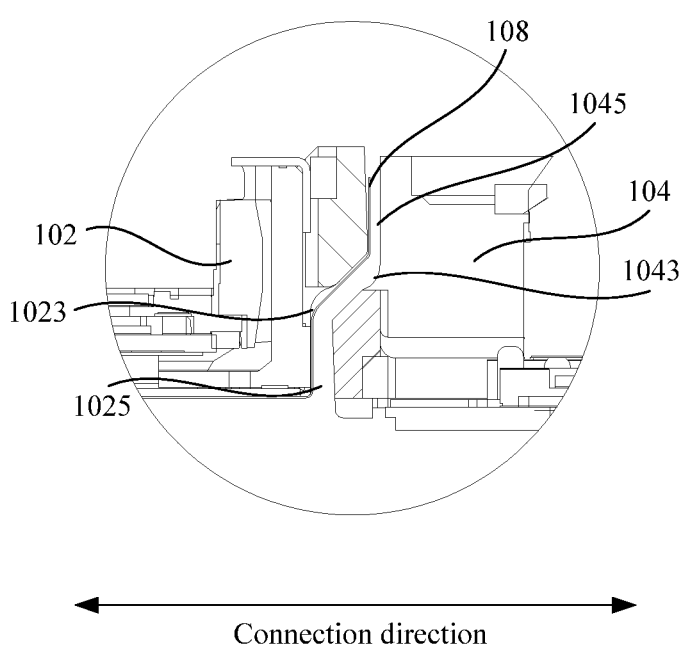
FIG. 4 is a schematic diagram of a partially enlarged structure of a camera assembly according to an embodiment of this application.

For example, the first holder 102 and the second holder 104 are disposed adjacent to each other. As shown in FIG. 4, a first mating chamfer 1023 and a second mating chamfer 1043 are respectively disposed on the first protrusion 1022 and the second protrusion 1042, so that the first protrusion 1022 and the second protrusion 1042 can be attached more closely through the abutment between the chamfers. This further reduces the overall size of the first holder 102 and the second holder 104 in the connection direction after being connected.

Optionally, a side of the first protrusion 1022 close to the second protrusion 1042 is provided with a first mating chamfer 1023, a side of the second protrusion 1042 close to the first protrusion 1022 is provided with a second mating chamfer 1043, and the first mating chamfer 1023 abuts against the second mating chamfer 1043.

In an embodiment, the first holder 102 and the second holder 104 are disposed left and right, the first protrusion 1022 is disposed on the right side of the first holder 102, the second protrusion 1042 is disposed on the left side of the second holder 104, the first mating chamfer 1023 is disposed on the right side of the first protrusion 1022, and the second mating chamfer 1043 is disposed on the left side of the second protrusion 1042.

For example, as shown in FIG. 4, the first holder 102 and the second holder 104 are disposed adjacent to each other, the first holder 102 is provided with a first avoidance groove 1025 adjacent to the first protrusion 1022, the second holder 104 is provided with a second avoidance groove 1045 adjacent to the second protrusion 1042, the first protrusion 1022 is disposed in the second avoidance groove 1045, and the second protrusion 1042 is disposed in the first avoidance groove 1025.

It can be understood that after protruding outward from the first holder 102 to form the first protrusion 1022, an adjacent depression, that is, the first avoidance groove 1025, will inevitably be formed adjacent to the first protrusion 1022. When the first holder 102 and the second holder 104 are mated, the first protrusion 1022 may be disposed in the second avoidance groove 1045, and the second protrusion 1042 may be disposed in the first avoidance groove 1025. An overlapping degree between the first protrusion 1022 and the second protrusion 1042 is higher, which is more beneficial to reduce the size of the first holder 102 and the second holder 104 in the connection direction when the first protrusion 1022 and the second protrusion 1042 are mated.

Optionally, there are a plurality of first protrusions 1022, and the first avoidance groove 1025 is disposed between any two adjacent first protrusions 1022. There are a plurality of second protrusions 1042, the second avoidance groove 1045 is disposed between any two adjacent second protrusions 1042, and the first protrusions 1022 and the second protrusions 1042 are disposed in a staggered manner. Through the foregoing arrangement manner, a wave coordination or a sawtooth coordination can be formed between the first protrusion 1022 and the second protrusion 1042. On this basis, when the first holder 102 and the second holder 104 are disposed adjacent to each other, the connection stability of the first holder 102 and the second holder 104 can be enhanced under the joint action of the protrusions and the avoidance grooves.

Figure 5:
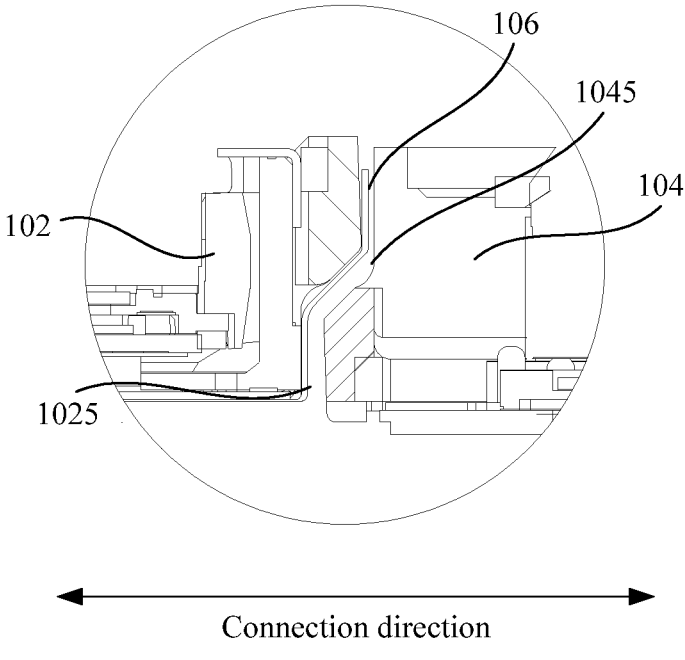
FIG. 5 is a schematic diagram of a partially enlarged structure of a camera assembly according to an embodiment of this application.
Figure 6:
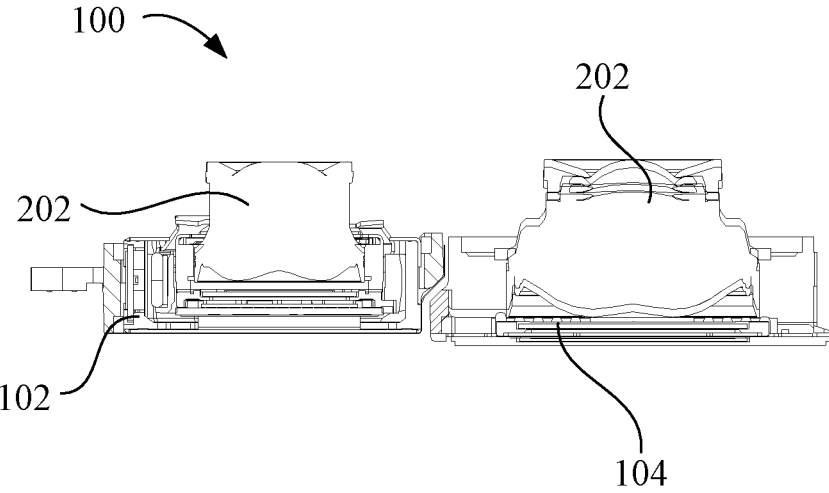
FIG. 6 is a schematic structural diagram of a camera assembly according to an embodiment of this application.

For example, as shown in FIG. 5, the first holder 102 and the second holder 104 are adjacent to each other. By disposing the sealing member 106 between the first protrusion 1022 and the second protrusion 1042, tiny substances such as dust and liquid can be effectively prevented from passing through the gap between the first protrusion 1022 and the second protrusion 1042 and moving to back sides of the first holder 102 and the second holder 104, thus reducing corrosion for electronic components such as a circuit board on the back side, and the like.

Optionally, the sealing member 106 is disposed on a side of the first protrusion 1022, and for example, disposed on the side of the first protrusion 1022 away from the first holder 102, so that when the first protrusion 1022 abuts against the second protrusion 1042, the sealing member 106 can be attached to the second protrusion 1042 to ensure a sealing effect between the first protrusion 1022 and the second protrusion 1042.

For example, as for disposing a camera on the first holder 102 and the second holder 104, a sealing requirement of the camera for taking pictures can be better met by disposing the sealing member 106.

In an embodiment, the sealing member 106 is disposed on the first protrusion 1022.

In another embodiment, the sealing member 106 is disposed on the second protrusion 1042.

In another embodiment, both the first protrusion 1022 and the second protrusion 1042 are separately provided with the sealing member 106, and the two sealing members 106 are attached to each other.

In another embodiment, as shown in FIG. 4, a heat dissipation plate 108 can be disposed between the first protrusion 1022 and the second protrusion 1042, so that an entire bottom of the camera assembly 100 can be conducted to the outside. Optionally, one end of the heat dissipation plate 108 abuts against a bottom of the first holder 102 or a bottom of the second holder 104, and the other end is disposed between the first protrusion 1022 and the second protrusion 1042, thereby expanding a heat dissipation area and enhancing a heat dissipation effect.

In another embodiment, a part of the heat dissipation plate 108 between the first protrusion 1022 and the second protrusion 1042 can play a sealing role, that is, the part achieves both the effect of a heat dissipation member and the effect of the sealing member 106.

Optionally, one or more first installation positions 1024 can be disposed on the first holder 102, so that different numbers of first cameras 202 can be installed on the first holder 102, so as to meet different photographing requirements. On this basis, the first protrusion 1022 is disposed on a periphery of the first installation position 1024, so that the overall size of the first holder 102 and the second holder 104 in the connection direction when being connected can be reduced without affecting a normal shooting function of the first camera 202 on the first holder 102.

For example, the number of the first installation positions 1024 on the first holder 102 can be set based on the size of the first camera 202 and the size of the first holder 102, and it is certain that imaging effects of different cameras 202 may also be considered.

Similarly, as for the second holder 104, one or more second installation positions 1044 for installing the second camera 204 can be disposed on the second holder 104, and during using, the second camera 204 can be installed on each second installation position 1044 to achieve shooting through the second camera 204. On this basis, the second protrusion 1042 is disposed on a periphery of the second installation position 1044. Generally, the second camera 204 finds a view through an axial direction. Therefore, by disposing the second protrusion 1042 in the periphery, on the one hand, interference to the second camera 204 for finding a view is reduced during connection, and on the other hand, the size in the connection direction can be reduced through an overlapping relationship between the first protrusion 1022 and the second protrusion 1042.

The connection between the first camera 202 and the first installation position 1024 may be detachable or fixed, and the connection between the second camera 204 and the second installation position 1044 may also be detachable or fixed.

Optionally, when the cameras is separately installed on the first installation position 1024 and the second installation position 1044, the light entering direction of the camera on the first installation position 1024 is parallel to the light entering direction of the camera on the second installation position 1044 during installation, that is, the light entering direction of the first camera 202 on the first installation position 1024 and the light entering direction of the second camera 204 on the second installation position 1044 are parallel to each other, so as to simultaneously optimize an image through a plurality of cameras during imaging, and it is also convenient to switch among a plurality of cameras with a same view finding direction during imaging.

On the basis that the light entering direction of the first camera 202 is parallel to the light entering direction of the second camera 204, the number of the first holders 102 is two, and the two first holders 102 are integrally formed. Since each first holder 102 is provided with a first camera 202, after the two first holders 102 are integrally processed, a part matching different second holders 104 in a staggered and stacked manner may be formed, and the size can be further reduced in a plurality of directions or in a single direction. Certainly, it can further be understood that because installation positions of different cameras need to meet specific requirements, installation position requirements of specific cameras can further be met through the foregoing integrated forming method.

Figure 7:
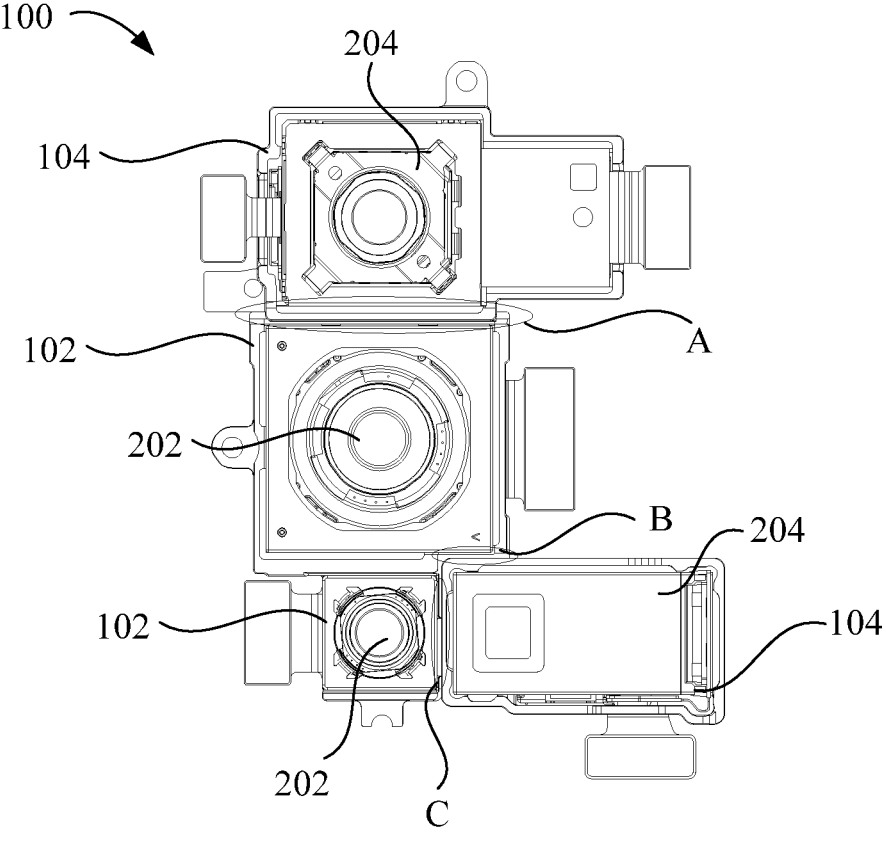
FIG. 7 is a schematic structural diagram of a camera assembly according to an embodiment of this application.

In addition, as shown in FIG. 7, this application further provides an embodiment of the camera assembly 100, including a first holder 102 with a first camera 202 and a second holder 104 with a second camera 204. Layout of four cameras is shown in the figure, a master camera is placed in the center, and the other three cameras are placed around the master camera. Because these three cameras need to cooperate with the master camera during operating, the three cameras all need to be close to the master camera in finding a view and cannot be too far away from the master camera, otherwise, the imaging effect will be poor. Micro pan/tilt herein is used as a wide-angle camera.

After the number of cameras of the mobile phone has increased to 4, and the micro pan/tilt and a periscope camera are relatively large as an individual, on the whole, it seems that an area occupied by 4 modules is relatively large. At first glance, there is a sense of abruptness, which is not delicate. In addition, the 4 camera modules are relatively large, and a space occupied by corresponding camera lenses will be relatively large. Because the camera lens is made of glass, the larger the lens, the easier it will crack during falling. In addition, because the 4 camera modules are relatively large, a space occupied on a printed circuit board (PCB) will be relatively large, and an available layout area for the PCB is small. As a result, a width or length of the entire camera need to be increased to meet a layout space of the PCB. In order to alleviate the foregoing problem, every two camera holders that are close to each other share one camera holder wall thickness in a Z-direction overlapped and distributed manner. As shown in FIG. 7, the micro pan/tilt camera and the master camera holder share one wall thickness A, and the master camera and the periscope camera share one wall thickness B. By adopting this structure, the overall size can be reduced by two holder wall thicknesses in Y direction (namely, an up and down direction in FIG. 7), and can be reduced by one holder wall thickness C in X direction. Due to the reduction of module size, the area of camera lens can be reduced, which can reduce the failure rate of camera lens, and can further improve a layout utilization rate of the PCB and optimize an outline size of mobile phone. In addition, when a distance between camera bodies is small, the imaging effect is better.

For example, as shown in FIG. 1, each of a holder of the micro-pan/tilt camera and a holder of the master camera keeps only half of the height of Z direction at adjacent positions, and the two holders overlap in the Z direction. A micro pan/tilt holder is disposed in the upper part, and a master camera holder is in the lower part.

Based on this, the Z-direction distribution design for disposing the camera holder needs to facilitate the assembly of the camera. In this embodiment, the master camera (that is, the first camera 202 in the center) is installed first, and then the micro pan/tilt (the second camera 204 located above) and the periscope camera (the second camera 204 at the lower right) are installed. A portrait camera is directly positioned on the master camera holder (that is, the holder of the first camera 202 located below is integrally formed with the holder of the first camera in the center).

Due to the structure particularity of the micro-pan/tilt, dust can directly fall on the surface of the lens after entering from the bottom. In order to ensure the dust-proof effect, a copper foil is required to be attached to the side to connect to the base to prevent dust from entering. In order to facilitate copper foil fitting, a transition of C-angle bevel (that is, the first mating chamfer 1023 and the second mating chamfer 1043) is required for the holder. This copper foil may improve both the heat dissipation performance and the electronic shielding performance of the camera.

Figure 8:
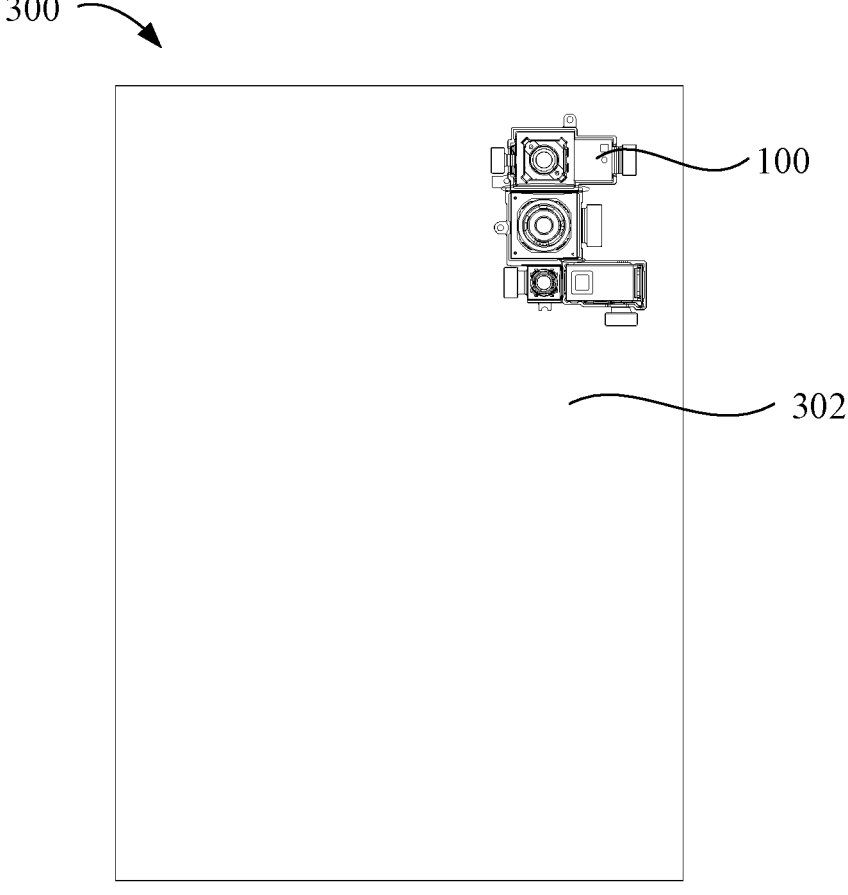
FIG. 8 is a schematic structural diagram of an electronic device according to an embodiment of this application.

As shown in FIG. 8, an electronic device 300 provided in an embodiment of this application includes a body 302 and a camera assembly 100. The camera assembly 100 is disposed on the body 302, and the camera assembly 100 can be a front camera module of the electronic device 300 or a rear camera module of the electronic device 300. The user may use the camera assembly 100 to take selfies and find views, so as to meet different shooting requirements.

In another embodiment, the first camera 202 of the camera assembly 100 may face the front of the electronic device 300, and the second camera 204 may face the back of the electronic device 300, so that the camera assembly 100 can be used to find views and take pictures in both the front and back directions, which can better meet different use requirements of users.

The electronic device in the embodiments of this application may be a mobile terminal such as a mobile phone, a wearable device, a tablet computer, a laptop computer, a mobile computer, a handheld game console, a video recorder, a camcorder, or the like. Certainly, the camera assembly can also be applied not only to the electronic device but also to other devices that are used to take pictures.

According to the embodiments of the camera assembly and the electronic device of this application, the first protrusion and the second protrusion are disposed in a staggered manner, which can reduce the space occupied by the first protrusion and the second protrusion at the joint, that is, the space occupied by the entire camera assembly is also reduced. Especially in a limited space, this can provide an installation space for other products.

In the description of this specification, description of the terms "an embodiment", "some embodiments", "specific embodiments" and the like means that a particular feature, structure, material, or characteristic described in combination with the embodiment or example is included in at least one embodiment or example of this application. In this specification, schematic representations of the foregoing terms are not necessarily directed to the same embodiment or example. Moreover, the particular feature, structure, material or characteristic described may be combined in any suitable manner in any one or more embodiments or examples.

The description above is only embodiments of this application, and is not used to limit this application. For a person skilled in the art, this application may have various modifications and changes. Any modification, equivalent replacement and improvement made within the spirit and principle of this application shall be included in the protection scope of this application.

What is claimed is:

1. A camera assembly, comprising: a first holder, a second holder, a first camera, a second camera and a heat dissipation plate, wherein
   the first camera is disposed on the first holder, and the second camera is disposed on the second holder;
   the second holder is disposed adjacent to the first holder, the first holder is provided with a first protrusion extending towards the second holder, the second holder is provided with a second protrusion extending towards the first holder, the first protrusion and the second protrusion are disposed in a staggered and stacked manner, and the first protrusion and the second protrusion are in surface contact; and
   one end of the heat dissipation plate abuts against a bottom of the first holder or a bottom of the second holder, and other end of the heat dissipation plate is disposed between the first protrusion and the second protrusion.

2. The camera assembly according to claim 1, wherein a side of the first protrusion close to the second protrusion is provided with a first mating chamfer, a side of the second protrusion close to the first protrusion is provided with a second mating chamfer, and the first mating chamfer abuts against the second mating chamfer.

3. The camera assembly according to claim 1, wherein the first holder is provided with a first avoidance groove adjacent to the first protrusion, the second holder is provided with a second avoidance groove adjacent to the second protrusion, the first protrusion is disposed in the second avoidance groove, and the second protrusion is disposed in the first avoidance groove.

4. The camera assembly according to claim 3, wherein there are a plurality of first protrusions, and the first avoidance groove is disposed between any two adjacent first protrusions; and
   there are a plurality of second protrusions, the second avoidance groove is disposed between any two adjacent second protrusions, and the first protrusions and the second protrusions are disposed in a staggered manner.

5. The camera assembly according to claim 1, further comprising:
   a sealing member, wherein the sealing member is disposed on a side of the first protrusion away from the first holder, and the sealing member is attached to the second holder; and/or
   the sealing member is disposed on a side of the second protrusion away from the second holder, and the sealing member is attached to the first holder.

6. The camera assembly according to claim 1, further comprising:

at least one first installation position disposed on the first holder, wherein each first installation position is used to install the first camera, and the first protrusion is disposed on a periphery of the first installation position; and at least one second installation position disposed on the second holder, wherein each second installation position is used to install the second camera, and the second protrusion is disposed on a periphery of the second installation position.

7. The camera assembly according to claim 1, wherein a light entering direction of the first camera is parallel to a light entering direction of the second camera.

8. The camera assembly according to claim 7, wherein a number of the first holder is two, and the two first holders are integrally formed.

9. An electronic device, comprising:

a body; and at least one camera assembly, disposed on the body, wherein the camera assembly comprises at least one of camera modules: a front camera module of the electronic device or a rear camera module of the electronic device; wherein the camera assembly comprises: a first holder, a second holder, a first camera, a second camera and a heat dissipation plate, wherein the first camera is disposed on the first holder, and the second camera is disposed on the second holder;

the second holder is disposed adjacent to the first holder, the first holder is provided with a first protrusion extending towards the second holder, the second holder is provided with a second protrusion extending towards the first holder, the first protrusion and the second protrusion are disposed in a staggered and stacked manner, and the first protrusion and the second protrusion are in surface contact; and one end of the heat dissipation plate abuts against a bottom of the first holder or a bottom of the second holder, and other end of the heat dissipation plate is disposed between the first protrusion and the second protrusion.

10. The electronic device according to claim 9, wherein a side of the first protrusion close to the second protrusion is provided with a first mating chamfer, a side of the second protrusion close to the first protrusion is provided with a second mating chamfer, and the first mating chamfer abuts against the second mating chamfer.

11. The electronic device according to claim 9, wherein the first holder is provided with a first avoidance groove adjacent to the first protrusion, the second holder is provided with a second avoidance groove adjacent to the second protrusion, the first protrusion is disposed in the second avoidance groove, and the second protrusion is disposed in the first avoidance groove.

12. The electronic device according to claim 11, wherein there are a plurality of first protrusions, and the first avoidance groove is disposed between any two adjacent first protrusions; and there are a plurality of second protrusions, the second avoidance groove is disposed between any two adjacent second protrusions, and the first protrusions and the second protrusions are disposed in a staggered manner.

13. The electronic device according to claim 9, wherein the camera assembly further comprises:

a sealing member, wherein the sealing member is disposed on a side of the first protrusion away from the first holder, and the sealing member is attached to the second holder; and/or the sealing member is disposed on a side of the second protrusion away from the second holder, and the sealing member is attached to the first holder.

14. The electronic device according to claim 9, wherein the camera assembly further comprises:

at least one first installation position disposed on the first holder, wherein each first installation position is used to install the first camera, and the first protrusion is disposed on a periphery of the first installation position; and at least one second installation position disposed on the second holder, wherein each second installation position is used to install the second camera, and the second protrusion is disposed on a periphery of the second installation position.

15. The electronic device according to claim 9, wherein a light entering direction of the first camera is parallel to a light entering direction of the second camera.

16. The electronic device according to claim 15, wherein a number of the first holder is two, and the two first holders are integrally formed.

* * * * *